United States Patent
Tollefson et al.

(10) Patent No.: US 10,617,132 B2
(45) Date of Patent: Apr. 14, 2020

(54) FROZEN CONFECTION KIOSK AND LIQUID-DISPENSING ASSEMBLY FOR USE THEREWITH

(71) Applicant: TIKIZ FRANCHISING, LLC, Boca Raton, FL (US)

(72) Inventors: Brian J. Tollefson, Boca Raton, FL (US); David S. Tollefson, Boca Raton, FL (US)

(73) Assignee: TIKIZ FRANCHISING, LLC, Boca Raton, FL (US)

( * ) Notice: Subject to any disclaimer, the term of this patent is extended or adjusted under 35 U.S.C. 154(b) by 0 days.

(21) Appl. No.: 15/982,708

(22) Filed: May 17, 2018

(65) Prior Publication Data

US 2018/0263257 A1 Sep. 20, 2018

Related U.S. Application Data

(63) Continuation of application No. 14/922,853, filed on Oct. 26, 2015, now Pat. No. 10,231,471, which is a continuation-in-part of application No. 13/559,664, filed on Jul. 27, 2012, now Pat. No. 9,352,679.

(51) Int. Cl.
*B60P 3/025* (2006.01)
*A23G 9/28* (2006.01)

(52) U.S. Cl.
CPC .............. *A23G 9/28* (2013.01); *B60P 3/0257* (2013.01)

(58) Field of Classification Search
CPC ....... B60P 3/0257; B60P 3/025; B60P 3/0255; A23G 9/045; A23G 9/28; A23G 9/225; A23G 9/245; A23G 9/281; A23G 9/282

USPC .......... 296/22, 24.36, 21, 38, 24.3; 222/608, 222/610, 146.6, 129.1, 132, 144.5, 108, 222/130; 224/509, 519, 527, 553
See application file for complete search history.

(56) References Cited

U.S. PATENT DOCUMENTS

| | | | |
|---|---|---|---|
| 184,292 A | 11/1876 | Matthews | |
| 1,170,712 A | 2/1916 | Trombley | |
| 1,327,248 A | 1/1920 | Moody | |
| 2,461,197 A * | 2/1949 | Chambers | A23G 9/225 222/130 |
| 2,733,094 A | 1/1956 | Carlton | |
| 3,006,487 A | 4/1959 | Gelli | |
| 2,973,823 A | 3/1961 | Stentz | |

(Continued)

FOREIGN PATENT DOCUMENTS

| | | |
|---|---|---|
| CA | 2357142 | 3/2003 |
| DE | 9405207 | 5/1994 |

(Continued)

OTHER PUBLICATIONS

Excalabar Staircase Offroad Camper Trailer, http://web.archive.org/web20120802023441/http://www.jimboombacampertrailers.com.au/product/2224/Excalabar-Staircase-Offroad-Camper-Trailer, 3 pages, Archived Aug. 2, 2012.

(Continued)

*Primary Examiner* — Charles Cheyney
(74) *Attorney, Agent, or Firm* — Millen, White, Zelano & Branigan, PC; Ryan Pool

(57) ABSTRACT

A kiosk for selling frozen confections such as shaved ice or ice cream may include with a liquid-topping dispenser assembly having liquid-dispensing faucets which are operable by a customer outside the kiosk to dispense liquid toppings onto the frozen confections.

17 Claims, 5 Drawing Sheets

(56) References Cited

U.S. PATENT DOCUMENTS

| | | | |
|---|---|---|---|
| 2,982,578 A * | 5/1961 | Lowe | B60P 3/0257 296/22 |
| 3,191,400 A | 6/1965 | Swenson | |
| 3,395,503 A | 8/1968 | Grenburg et al. | |
| 3,476,295 A | 11/1969 | Telfer | |
| 3,753,520 A | 8/1973 | Bodde | |
| 3,845,891 A | 11/1974 | Becher | |
| 3,887,132 A | 6/1975 | Widmer | |
| 3,934,924 A | 1/1976 | Diliberti | |
| 4,076,349 A | 2/1978 | Gettleman et al. | |
| 4,089,554 A | 5/1978 | Myers | |
| 4,225,059 A | 9/1980 | Kappos | |
| 4,288,034 A | 9/1981 | Widmer et al. | |
| 4,359,073 A | 11/1982 | de Stoutz | |
| 4,375,306 A | 3/1983 | Linder | |
| 4,456,149 A | 6/1984 | Sciortino | |
| 5,114,120 A | 5/1992 | Bartelt | |
| 5,154,317 A | 10/1992 | Roppolo, III | |
| 5,263,467 A | 11/1993 | Jones | |
| 5,307,957 A | 5/1994 | Carlsson et al. | |
| 5,375,767 A | 12/1994 | Thorstensson | |
| 5,390,834 A | 2/1995 | Bitter | |
| 5,452,825 A | 9/1995 | Comstock et al. | |
| 5,518,156 A | 5/1996 | Lehman | |
| 5,544,799 A * | 8/1996 | Didlake | B60R 9/06 224/282 |
| 5,564,597 A | 10/1996 | Koorse et al. | |
| 5,711,073 A | 1/1998 | Tippmann et al. | |
| 6,189,944 B1 | 2/2001 | Piche | |
| 6,701,913 B1 * | 3/2004 | Leduc | B60R 9/06 126/276 |
| 6,814,383 B2 | 11/2004 | Reed et al. | |
| 7,044,335 B2 | 5/2006 | Aguirre et al. | |
| 7,152,812 B1 | 12/2006 | Johnson | |
| 7,159,917 B2 | 1/2007 | Haaberg | |
| 7,364,050 B2 | 4/2008 | Guard | |
| 7,413,132 B1 | 8/2008 | Bogart et al. | |
| D580,071 S | 11/2008 | Evans et al. | |
| 7,591,404 B2 | 9/2009 | LeDuc et al. | |
| 7,669,740 B2 | 3/2010 | Saunders et al. | |
| D633,007 S | 2/2011 | Evans | |
| 8,157,136 B2 | 4/2012 | Lamb et al. | |
| 8,231,036 B2 | 7/2012 | Campbell et al. | |
| 8,672,200 B2 | 3/2014 | O'Hare | |
| 8,844,994 B2 | 9/2014 | White et al. | |
| 8,925,777 B1 | 1/2015 | Casucci et al. | |
| 9,321,387 B2 | 4/2016 | Lamb | |
| 9,668,498 B2 * | 6/2017 | Rupp | A23G 9/245 |
| 2004/0016772 A1 * | 1/2004 | Rupp | B67D 3/0019 222/108 |
| 2004/0256872 A1 | 12/2004 | Piper et al. | |
| 2008/0083352 A1 | 4/2008 | Tovani | |
| 2008/0179346 A1 * | 7/2008 | Downey | A23G 9/045 222/146.6 |
| 2009/0078724 A1 * | 3/2009 | Lamb | B60P 3/0257 222/608 |
| 2010/0001029 A1 | 1/2010 | Tai | |
| 2014/0239020 A1 | 8/2014 | Lamb | |
| 2016/0264033 A1 | 9/2016 | Tollefson et al. | |

FOREIGN PATENT DOCUMENTS

| | | |
|---|---|---|
| DE | 29506844 | 6/1995 |
| DE | 199505769 | 8/2000 |
| DE | 202004008104 | 8/2004 |
| DE | 102013010115 | 12/2014 |
| JP | H0826018 | 1/1996 |
| JP | H1159260 | 3/1999 |
| JP | 3162590 | 5/2001 |
| WO | 200023299 | 4/2000 |
| WO | 2013014692 | 1/2013 |

OTHER PUBLICATIONS

Jimboomba Camper Trailers, Trailer Optional Extra's http://web.archive.org/web/20120907015647/http://www.jimboombacampertrailers.com.au/product/2226/Trailer-Optional-Extras, 5 pages, Archived Sep. 7, 2012.

Amy Reinink, How to Start a Food Truck, https://www.entrepreneur.com/article/217941, Jan. 19, 2011, 7 pages.

Red Hook Lobster Pound DC: First Look with Photos, https://capitalspice.wordpress.com, Aug. 13, 2010, 4 pages.

"Car Wash Equipment." by Martin Mobile Fleet Wash Systems. N.p., n.d. Web Jan. 31, 2014. <http://www.hoffrog.com/Companies/Martin-Mobile-Fleet-wash-Systems/car-wash-equipment-236538>.

* cited by examiner

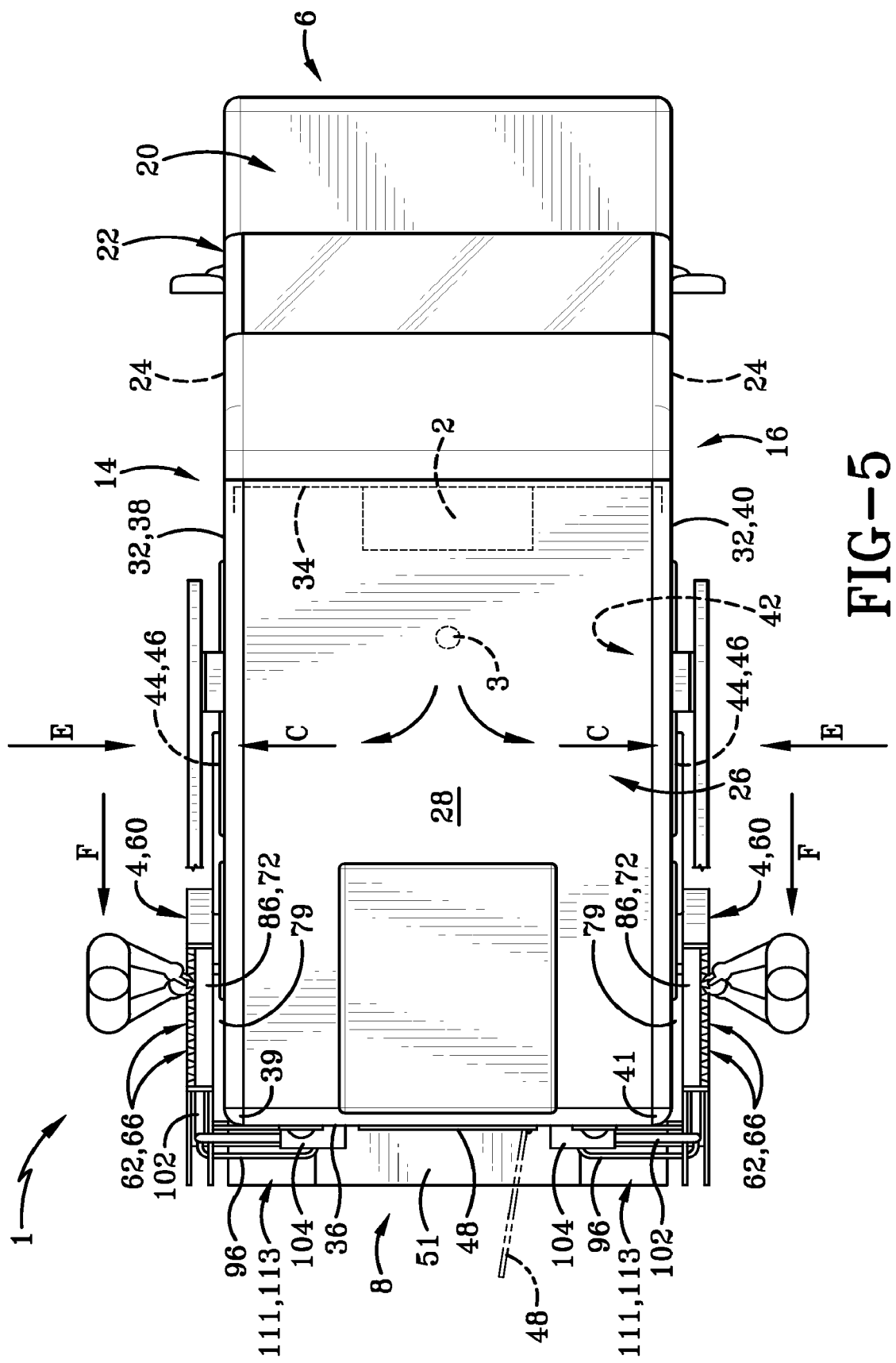

FROZEN CONFECTION KIOSK AND LIQUID-DISPENSING ASSEMBLY FOR USE THEREWITH

BACKGROUND

1. Technical Field

The technical field relates generally to a kiosk for dispensing food and drink items, especially frozen confections such as ice cream, snow cones, shaved ice and the like. More particularly, the technical field relates to such a kiosk and a liquid topping dispenser assembly which may be accessed by customers outside the kiosk.

2. Background Information

Stationary and mobile kiosks are well known for selling various frozen confections, such as ice cream, shaved ice, snow cones, beverages and so forth. If the kiosk is set up for selling ice cream, there are typically either containers of ice cream which can be scooped into a cone or dish, or soft ice cream makers within the kiosk whereby a person within the kiosk may prepare the ice cream confection for dispensing through a service window upon payment for the item. A kiosk may also be set up to create snow cones, or shaved ice, also typically known as Italian ice. A liquid topping dispenser may be inside the kiosk for dispensing a sweet liquid topping onto the crushed ice or shaved ice in order to produce the confection which is dispensed through the service window. It is also known to provide a liquid topping dispenser assembly which is accessible from outside the kiosk so that the customer can apply the liquid topping to the ice cream, crushed ice, shaved ice, etc. However, there is still room for improvement in the art.

SUMMARY

In one aspect, an apparatus may comprise a kiosk comprising a sidewall defining an interior chamber; a mounting bracket extending external to the sidewall; and a liquid-topping dispenser assembly comprising a support and a plurality of liquid-dispensing faucets carried by the support; wherein the dispenser assembly is secured to the mounting bracket so that the dispenser assembly is fixed with respect to the sidewall, entirely external to the sidewall, and spaced outwardly from the sidewall.

In another aspect, an apparatus may comprise a kiosk comprising a sidewall defining an interior chamber; a liquid-topping dispenser assembly comprising a support and a plurality of liquid-dispensing faucets carried by the support; wherein the dispenser assembly extends external to the sidewall; the support has first and second opposed sides and defines an opening which is below the faucets and extends from the first side to the second side such that a frozen confection may pass entirely through the opening from the first side to the second side; the support has an upper arm which is above the through opening and on which the faucets are mounted; and the support has a lower arm which is below the through opening and comprises a drain pan.

BRIEF DESCRIPTION OF THE SEVERAL VIEWS OF THE DRAWINGS

A sample embodiment is set forth in the following description and is shown in the drawings and is particularly and distinctly pointed out and set forth in the appended claims.

FIG. 5 is a top plan view showing the vehicle with two liquid topping dispenser assemblies mounted respectively near the rear left and right corners of the vehicle and illustrating various aspects of the use of the vehicle.

Similar numbers refer to similar parts throughout the drawings.

DETAILED DESCRIPTION

Figure 1:
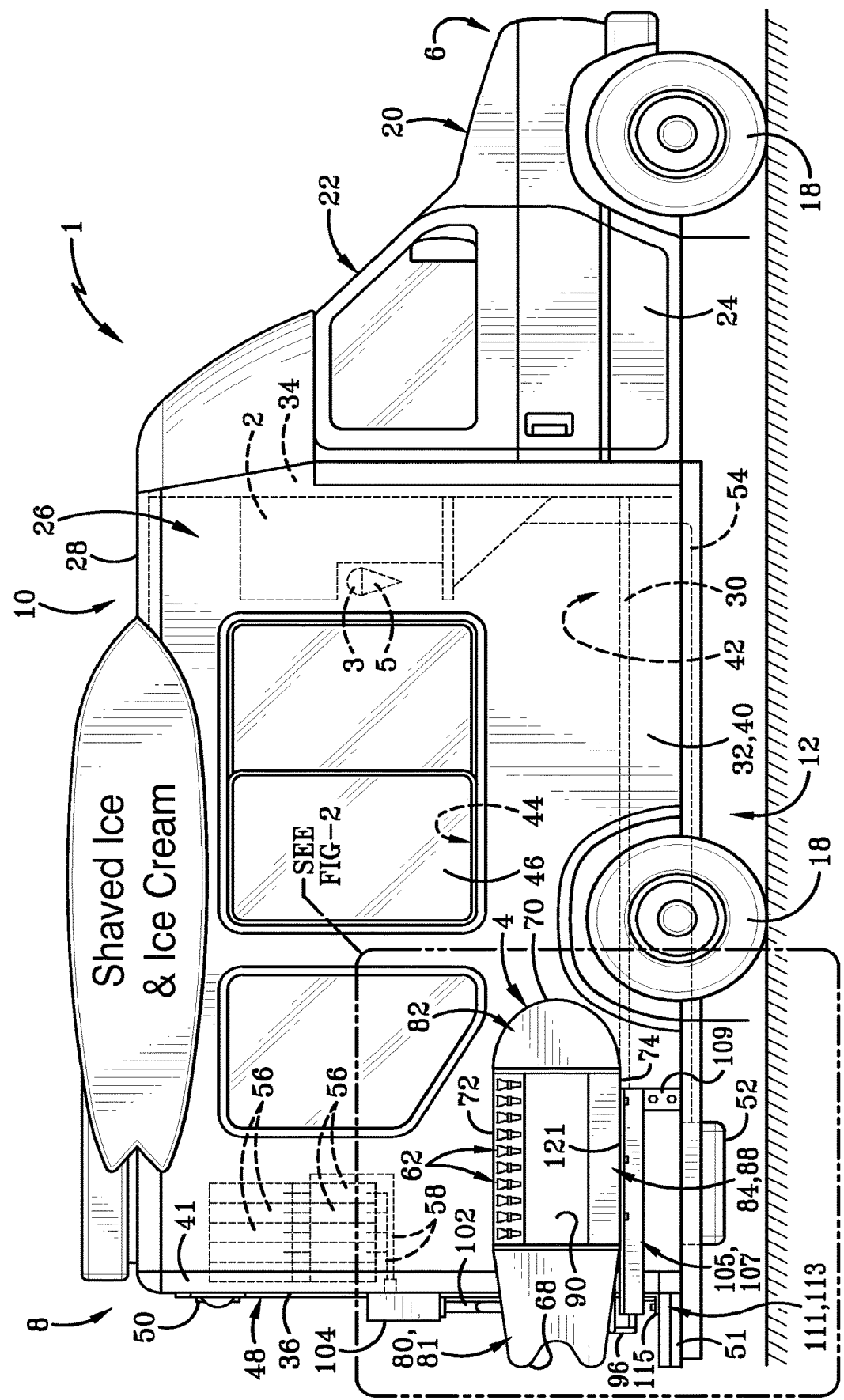
FIG. 1 is a right side elevational view of a kiosk shown as a mobile vehicle with a liquid topping dispenser assembly mounted adjacent the rear of the vehicle.

A kiosk is illustrated generally at 1 in FIG. 1. Although kiosk 1 is illustrated in the Figures as a motorized mobile vehicle, it will be understood by one skilled in the art that kiosk 1 may also represent a non-motorized wheeled vehicle, such as a trailer, or a non-wheeled kiosk, which may be seated directly on the ground and either be a permanent structure or one which is portable by, for instance, being picked up by a separate mobile vehicle. Kiosk or vehicle 1 may be configured to produce frozen confections 3 as discussed in the Background section of the present application such as to be contained in a container 5, such as a cup, cone, dish or the like. Kiosk 1 may be configured with a frozen confection forming device 2 inside the kiosk and a liquid-topping dispenser assembly 4 which is configured to be operated by people/customers outside the kiosk. Thus, vehicle 1 may be configured for an operator or other person within the kiosk to produce a frozen confection such as ice cream, a snow cone, shaved ice and the like and dispense it to a customer outside the vehicle so that the customer may dispense the liquid topping with dispenser 4 onto the crushed ice, shaved ice, or frozen confection of any sort.

Vehicle 1 has a front 6 and a back 8 defining therebetween a longitudinal direction of the vehicle or kiosk, a top 10, a bottom 12, and left and right sides 14 and 16 (FIG. 5) defining therebetween an axial direction of the vehicle or kiosk. Where kiosk 1 is in vehicular form, the longitudinal direction may also represent the travel direction of the vehicle. Vehicle 1 includes ground engaging wheels 18 which are rotatably mounted on the frame of the vehicle and include a front set 18 adjacent front 6 and a rear set generally adjacent back 8. Vehicle 1 further includes an engine compartment 20 housing an engine (not shown) which drives rotation of at least some of the wheels in order to cause the vehicle to travel.

Vehicle 1 may further include a cab 22 with doors 24 on the driver side and passenger side (left and right sides of vehicle 1/cab 22), and a cargo body or box 26 extending from adjacent the back of cab 22 to adjacent back 8 of the vehicle.

Body 26 may include essentially horizontal and rectangular top and bottom walls 28 and 30 and a sidewall 32 secured to and extending between the top and bottom walls 28 and 30. Body 26/walls 28, 30 and 32 may be rigid. Sidewall 32 is an upwardly extending wall which may be an essentially vertical wall and which may include essentially vertical front and back walls 34 and 36 which may be essentially parallel to one another, which are rectangular or square as viewed from the back or front, and which extend axially along respective vertical axial planes. Sidewall 32 may further include essentially vertical left and right walls 38 and 40 which may be essentially parallel to one another and perpendicular to front and back walls 34 and 36. Left and right walls 38 and 40 extend longitudinally and may lie along respective longitudinal vertical planes. Walls 34, 36, 38 and 40 may be rigid and fixed with respect to one another and may be joined to form respective essentially vertical corners. More particularly, the rear end of left wall 38 and a left side of back wall 36 may intersect at an essentially vertical left rear corner 39. Similarly, the rear end of right wall 40 and the right side of back wall 36 may intersect at an essentially vertical right rear corner 41. Each of corners 39 and 41 may extend from adjacent top wall 28 to adjacent and lower than bottom wall 30. Top wall 28, bottom wall 30 and sidewall 32 may define therewithin an interior chamber 42. The cargo body 26 may have a generally box shaped or parallelepiped configuration. Bottom wall 30 may be spaced upwardly of the bottom of sidewall 32 including upward of the bottom of walls 34, 36, 38 and 40 so that lower portions of walls 32, 34, 36, 38 and 40 may extend downward lower than bottom wall 30. Bottom wall 30 may, for instance be at about the same height as the bottom of back door 48 and the bottom of the doorway which door 48 covers when closed.

An opening or service window 44 may be formed through right wall 40 with a panel, door or window pane 46 mounted to move between an open and closed position for respectively opening and closing serving window 44. An additional service window 44 and corresponding panel, door or window pane may be positioned along the left side of the vehicle alternatively or in addition to the one along the right side, as illustrated in FIG. 5. Vehicle 1 may have a back door 48 which is movable between a closed position and an open position (dashed lines in FIG. 5). Back door 48 may be mounted on hinges 50 in order to pivot about a vertical axis between the open and closed positions, whereby a person may enter and exit the interior chamber 42 when back door 48 is open. Vehicle 1 may further include a rigid back bumper or step 51 which may be an essentially horizontal axially elongated member which may extend rearward of or be entirely rearward of back wall 36. Bumper 51 may extend from adjacent the bottom of left rear corner 39 to adjacent the bottom of right rear corner 41 and may extend rearwardly from adjacent the bottom of back wall 36. Step 51, which may be rigidly secured to the vehicle frame, may thus be configured for a person to step up onto when entering the inside of the kiosk through back door 48.

A waste liquid reservoir or container 52 may be mounted on vehicle 1 adjacent the back end thereof along the bottom of the frame, although the specific position may vary. Container 52 may also be within or separate from the vehicle, for instance sitting on the ground. A drain line 54 may be connected at one end to forming device 2 with another end thereof connected to container 52 or a separate waste liquid container. A plurality of liquid topping containers 56 may be disposed within interior chamber 42 and contain various types of potable liquid toppings (typically having different flavors) which can be dispensed through dispenser assembly 4. Ten of the containers 56 are shown in FIG. 1, although this number may vary. Feed lines 58 may be provided which may be in the form of flexible hoses or tubes for providing fluid communication between the respective containers 56 and dispenser assembly 4. Thus, one end of each feed line 58 is connected to an outlet of container 56.

Figure 2:
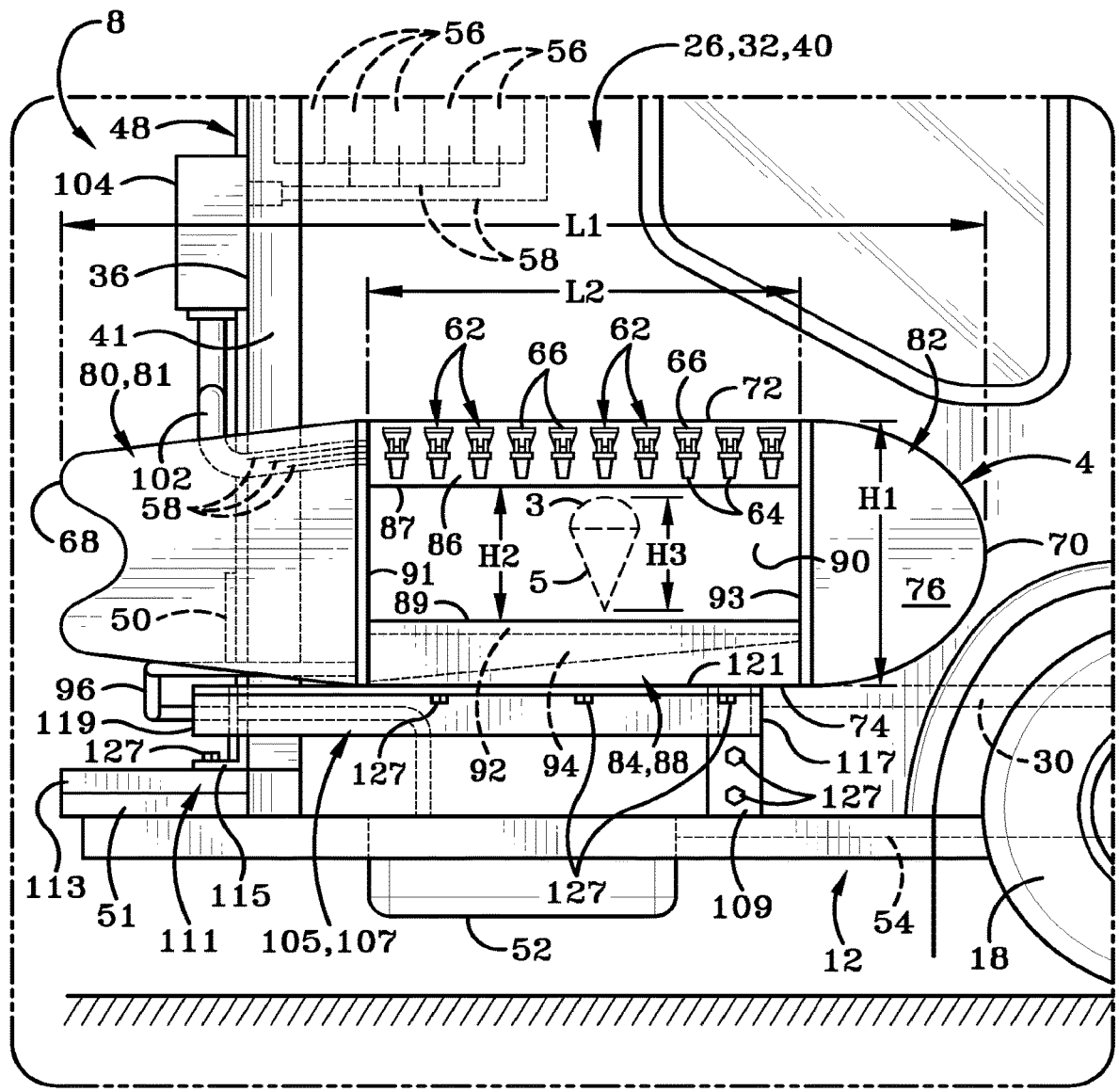
FIG. 2 is an enlarged right side elevational view of a right rear portion of the kiosk/vehicle and liquid topping dispenser assembly.

FIG. 2 shows a right dispenser assembly 4 mounted on vehicle 1, while FIG. 5 also shows a left dispenser assembly 4 mounted on vehicle 1. The right dispenser assembly 4 may be mounted adjacent the right rear corner 41, and the left assembly 4 may be mounted adjacent the left rear corner 39. The left dispenser assembly 4 may be mounted in the same manner as the right dispenser assembly 4 except in a mirror image fashion such that the left dispenser assembly 4 is generally to the left of left wall 38.

With primary reference to FIG. 2, the right dispenser assembly will first be described. It will be understood that much of the description of the right assembly 4 also applies to the left assembly 4 although the two dispenser assemblies may be mirror images. The left and right assemblies 4 may also be mounted in different locations such that components that extend to the right and left with respect to the right assembly 4 may extend respectively to the left and right with respect to the left assembly 4, or surfaces which may be leftward facing and rightward facing with respect to the right assembly 4 may respectively be rightward facing and leftward facing with respect to the left assembly 4. The various similarities and differences between the left and right dispenser assemblies 4 should be evident from the Figures even if not described explicitly herein.

Right dispenser assembly 4 may include a rigid dispenser support 60 and a plurality of faucets 62 carried thereby wherein each faucet 62 includes a spout 64 and a control 66 which is manually operable and may be in the form of a button or handle which is movable from a closed position to an open position by manual engagement by a person outside the kiosk. Dispenser assembly 4 may be mounted adjacent and entirely external to box 26 and kiosk 1. Dispenser assembly 4 may be fixedly attached to kiosk/vehicle 1 so that assembly 4 is fixed with respect to sidewall 32 and its various walls 34, 36, 38 and 40. Assembly 4 may be spaced outwardly from body 26/sidewall 32 so that assembly 4 is out of contact with sidewall 32.

Support 60 has a first or rear end 68 and a distal second or front end 70 such that support 60 and assembly 4 may be longitudinally elongated from rear end 68 to front end 70. Ends 68 and 70 define therebetween a horizontal longitudinal length L1 which may be in a range of about 3 or 4 feet to about 6 feet and may be on the order of about 5 feet. Given that dispenser assembly 4 may have a substantial length and that it is spaced outwardly of body 26 of kiosk/vehicle 1, assembly 4 may provide a visual display which maybe a customer attracting feature, especially given a specific shape which customers may come to recognize as indicative of the given vendor. Rear end 68 may be adjacent (and rearward of or forward of) corner 41 and the lower end thereof, the right side of back wall 36 and the bottom thereof, and the back end of right wall 40 and the bottom thereof. Front end 70 may be adjacent and rearward of rear wheels 18.

Figure 3:
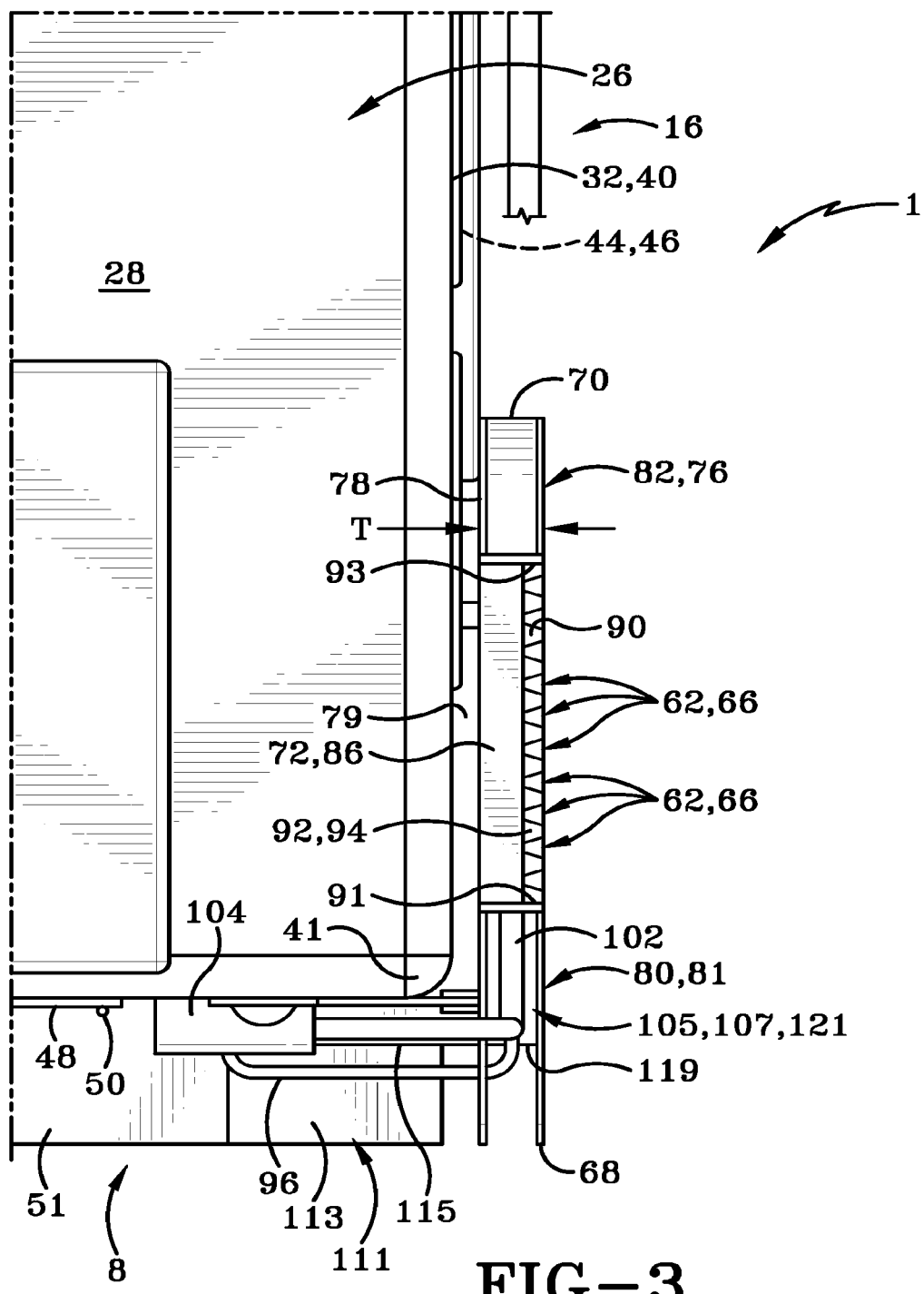
FIG. 3 is an enlarged top plan view of a right rear portion of the kiosk/vehicle and dispenser assembly.

Support 60 has a top 72 and a bottom 74 defining therebetween a vertical distance or height H1 (FIG. 2) which may be, for instance, no more than ½ length L1 or ⅓ length L1. Height H1 may be approximately ⅓ of length L1 or slightly less. Support 60 has first and second surfaces or sides 76 and 78 defining therebetween a horizontal thickness T (FIG. 3) which may be, for example, no more than one-half (½) height H1 or one-third (⅓) height H1. Thickness T may be about one-fourth (¼) height H1. Each of sides 76 and 78 may be an essentially flat vertical surface extending from adjacent rear end 68 to adjacent front end 70 and from adjacent top 72 to adjacent bottom 74. Side or surface 76 may be a rightward facing right side or surface, and side or surface 78 may be a leftward facing left side or surface such that thickness T is an axial thickness.

Support 60 may include a rear segment 80, a front segment 82 and a central or intermediate segment 84 connected to and extending between rear and front segments 80 and 82. Rear segment 80 may include first and second walls 81 and 83 which may be flat, vertical, parallel and spaced from one another to define therebetween an essentially vertical open space 85. Intermediate segment 84 may include an essentially horizontal upper arm 86 and an essentially horizontal lower arm 88 each of which extends between and is secured to rear and front segments 80 and 82.

Left surface 78 of support 60 may face and be parallel to and spaced from right wall 40 and the rightward facing surface thereof. Left surface 78 and the rightward facing surface of right wall 40 may define therebetween an open space 79 which may extend from adjacent rear end 69 to adjacent front end 70 and from adjacent top 72 to adjacent bottom 74. Right surface 76 of support 60 may face away from and be parallel to and spaced from right wall 40 and the rightward facing surface thereof.

A set of faucets 62 may be mounted on upper arm 86 and extend outwardly therefrom in a first direction (to the right in this case) within a recess generally along side 76. It may be that no portion of any of faucets 62 extends outwardly beyond side 76 (outwardly to the right beyond right side/surface 76). The various faucets 62 may be longitudinally spaced from one another along the length of assembly 4/support 60 at regular intervals so that one of the faucets 62 is a rearmost faucet and the remaining faucets 62 are sequentially forward of and further away therefrom. Thus, faucets 62 may be equally spaced along the length of support 60. Each of faucets may be the same horizontal axial or normal distance from the right side or surface of right wall 40.

Support 60 may define a rectangular through opening 90 extending from first side 76 to second side 78. More particularly, opening 90 may be defined by an essentially horizontal downwardly facing bottom surface 87 of upper arm 86, an essentially horizontal upwardly facing top surface 89 of lower arm 88, an essentially vertical forward facing surface 91 of rear segment 80 and an essentially vertical rearward facing surface 93 of front segment 82. Surfaces 91 and 93 may be essentially parallel and face one another and define therebetween a horizontal length L2 which may be at least ¼ length L1 or at least ⅓ length L1. Length L2 may be about and slightly less than ½ length L1. The respective rear and front ends of upper and lower arms 86 and 88 may be secured respectively to surfaces 91 and 93, whereby the rear and front ends of each arm may define therebetween length L2 of each arm 86 and 88, whereby said length may be the same as the length of opening 90. Bottom and top surfaces 87 and 89 may define therebetween a vertical distance or height H2 which may be about 12 inches although this may vary somewhat and may more particularly be configured to allow the frozen confection and its container to pass through opening 90 from one side to the other side of support 60. Thus, the confection 3 and its cone, cup or dish 5 together may have as measured from top to bottom a height H3 which is less than height H2. Space 79 may be in communication with through opening 90 with opening 90 directly to the right of space 79. Opening 90 may also be directly to the right of right wall 40.

A flow through structure such as a grate 92 or a plate with multiple apertures extending from the top to the bottom may be disposed within a cavity defined by lower arm 88 along the top of arm 88. An angled or inclined drip pan or flow pan 94 may also be disposed within this cavity of arm 88 and may, for example, angle downward and rearward toward rear end 68 (or downward and forward toward front end 70). Thus, any drips or overflow liquid coming from faucets 62 which is not dispensed on the frozen confection or a container or the like may drip down or fall onto and through the flow through structure 92 and onto drip pan 94, along which the liquid may flow, for instance, downwardly toward rear end 68 (or front end 70) and into a drain hose 96 having one end connected to the drip pan adjacent its lower end and another end in fluid communication with container 52 for emptying the waste liquid into container 52.

Dispenser assembly 4 may be entirely to the right of right wall 40 such that no portion of assembly 4 is directly behind back wall 36. Over ½ or ¾ length L1 of dispenser assembly 4 or all of assembly 4 may be directly to the right of right wall 40 and forward of back wall 36 and the front of bumper 51. Front end 70, front segment 82, intermediate segment 84 including upper and lower arms 86 and 88, faucets 62, opening 90, surfaces 91 and 93, grate 92, pan 94 and a portion of rear segment 80 may be directly to the right of right wall 40 and forward of back wall 36. Faucets 62 may be longitudinally spaced from one another and not axially spaced from one another.

A hose bundle 102 made up of hoses 58 may extend within space 85 and also external to space 85 from adjacent rear end 68 to a hose cover or hose junction box 104 which may be rigidly secured to back wall 36. Thus, one end of each hose 58 may be connected to a corresponding faucet 62 whereby hoses 58 may provide respective fluid communication between the respective containers 56 (FIG. 1) and faucets 62. It is noted that inasmuch as there are ten faucets 62 shown in the figures, there may accordingly be ten hoses 58 connected respectively thereto as well as ten topping containers 56 connected respectively to the opposite ends of hoses 58. Hose cover 104 may have a removable panel or openable door which allows access to hoses 58 within the interior chamber defined by cover 104. Each hose 58 may include two segments which are connected to one another by a quick disconnect connection which may be disposed within box 104. Hoses 58 extend through a hole (covered by box 104) which may be formed in back wall 36 or one of the left and right walls of body 26 such that the hole extends from outside the vehicle/kiosk 1/body 26 to interior chamber 42.

A mounting bracket 105 may be provided to mount each of the left and right dispenser assemblies 4 outside body/box 26. That is, there may be left and right brackets 105 for respectively mounting the left and right assemblies 4. As with the description of the left and right assemblies 4 above, the right mounting bracket 105 will be described, and it will be understood that the left bracket 105 may be a mirror image of the right bracket 105 and may have components that extend in directions opposite that of the right bracket 105 and/or have surfaces that face in the direction opposite that of right bracket 105.

Right bracket 105 may be in its entirety adjacent rear corner 41, the right side of back wall 36 and the rear section of right wall 40 rearward of rear wheels 18. Bracket 105 may be in its entirety adjacent the bottom of sidewall 32. A portion of bracket 105 may be directly behind back wall 36 and a portion of bracket 105 may be directly to the right of right wall 40. Assembly 4/support 60 may be rigidly or fixedly secured to bracket 105. Bracket 105 may be rigidly or fixedly secured to bumper 51, body 26 and/or the frame or chassis of vehicle 1. Bracket 105 may be a rigid structure which may be formed as one unitary piece or a plurality of rigid pieces which may be rigidly secured to one another by one or more welds or one or more other fasteners such as threaded fasteners, for instance, screws and/or externally threaded bolts which may be threadedly engaged with internally threaded holes or nuts.

Bracket 105 may include a support bar 107, which may also be a longitudinally elongated longitudinal bar or shelf. Bracket 105 may also include a front spacer or mounting member 109 and a rear spacer or mounting member 111. Bar 107 and front spacer 109 may be entirely to the right of right wall 40. Rear spacer 111 may include a plate 113 and an axial bar 115. Spacer 111 including plate 113 and bar 115 may extend directly behind back wall 36. Bar 107 may have front and rear ends 117 and 119. Front spacer 109 may be adjacent front end 117 and extend inwardly from bar 107 to right wall 40/sidewall 32. Support bar 107 may be in the form of an angle iron although other configurations may be used. Bar 107 may have an upwardly facing top surface 121 which may be horizontal and longitudinally elongated from adjacent front end 117 to adjacent rear end 119. Bottom 74 of dispenser assembly 4/support 60 may be seated on and in contact with upwardly facing top surface 121 of bracket 105/bar 107 so that dispenser assembly 4/support 60 extend upwardly therefrom. Assembly 4/support 60/faucets 62 may be entirely higher than surface 121. Rear spacer 111/axial bar 115 may have an inner or left end 123 and an outer or right end 125. Inner end 123 may be directly above bumper 51 and plate 113, and outer end 125 spaced outwardly (to the right) of bumper 51 and plate 113 so that outer end 125 is not directly above bumper 51 and plate 113. Inner end 123 may be to the left of right wall 40 and outer end 125 may be to the right of right wall 40. Bar 107 adjacent rear end 119 may be rigidly or fixedly secured to rear spacer 111/bar 115 adjacent right end 125 and extend forward therefrom. Spacer 111/plate 113 may be in contact with bumper 51. Spacer 109 may be in contact with right wall 40/sidewall 32.

Figure 4:
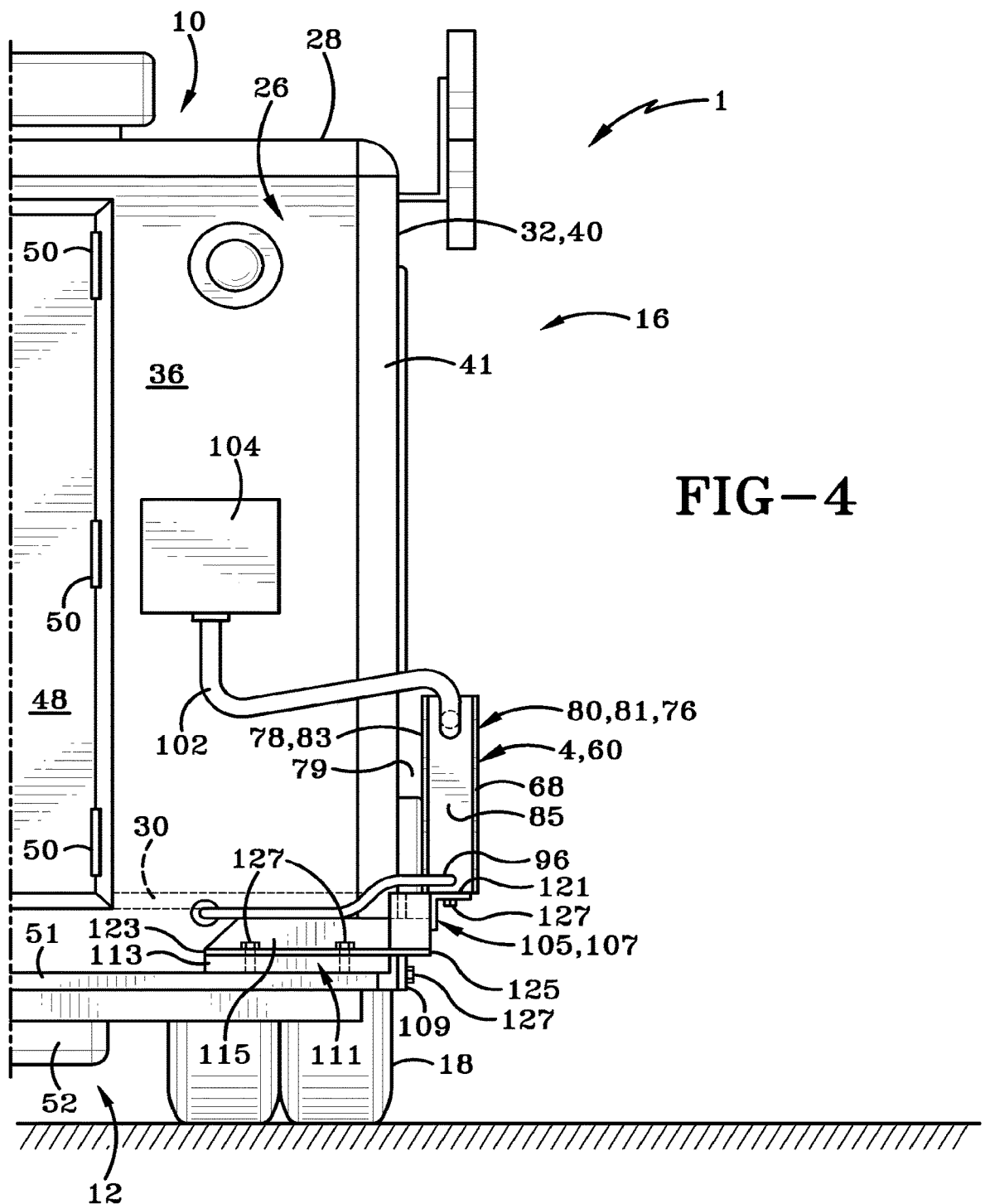
FIG. 4 is an enlarged rear elevation view of a right rear portion of the kiosk/vehicle and dispenser assembly.

The various components which make up bracket 105 (such as bar 107, spacers 109 and 111 including plate 113 and bar 115) and which are in contact with or closely adjacent one another may be secured to one another by welds or other fasteners such as fasteners 127. Fasteners 127 may be threaded fasteners such as screws or threaded bolts which threadedly engage an internally threaded hole or nut. Fasteners 127 are particularly shown in FIG. 4 extending downward from bar 115 to plate 113 and bumper 51 to rigidly or fixedly secure bar 115 to plate 113 and bumper 51, thereby also rigidly or fixedly securing bracket 105 to bumper 51. Fasteners 127 are also shown in FIG. 2 extending axially from front spacer 109 to right wall 40 to rigidly or fixedly secure spacer 109 to right wall 40/sidewall 32, thereby also rigidly or fixedly securing bracket 105 to right wall 40/sidewall 32. The fasteners extending from spacer 109 to right wall 40 may be lower than bottom wall 30 and thus pass through and/or engage the portion of right wall 40 which extends lower than bottom wall 30. FIG. 2 also shows fasteners 127 extending upward from bar 107/surface 121 to support 60/assembly 4 along the bottom 74 thereof to rigidly or fixedly secure support 60/assembly 4 to bar 107/bracket 105.

The right dispenser assembly 4 and the right bracket 105 are described above. Some aspects of left dispenser assembly 4 and left mounting bracket 105 are noted below, that is, the primary distinctions which relate to the position of the left assembly 4 and left bracket 105 relative to the sidewall 32 and other components, as well as left assembly 4 and left bracket 105 being essentially mirror images of the right assembly 4 and right bracket 105. Generally, left assembly 4 and left bracket 105 may extend outwardly to the left beyond left wall 38 and the various other components of vehicle 1. The various components of right assembly 4 and right bracket 105 which may be to the right of or extend to the right of other components may in the case of the left assembly 4 and left bracket 105 be to the left of or extend to the left of analogous components. Similarly, the various components of right assembly 4 and right bracket 105 which may be to the left of or extend to the left of other components may in the case of the left assembly 4 and left bracket 105 be to the right of or extend to the right of analogous components.

Right surface 78 of left support 60 may face and be parallel to and spaced from left wall 38 and the leftward facing surface thereof. Right surface 78 of left support 60 and the leftward facing surface of right wall 40 may define therebetween a left open space 79 as noted above with respect to right support 60. Left surface 76 of left support 60 may face away from and be parallel to and spaced from left wall 38 and the leftward facing surface thereof.

A set of left faucets 62 may be mounted on upper arm 86 of left support 60 and extend outwardly therefrom to the left within a recess generally along left side 76. It may be that no portion of any of faucets 62 extends outwardly to the left beyond side/surface 76. Each of the left faucets may be the same horizontal axial or normal distance from the left side or surface of left wall 38. Left space 79 may be in communication with left through opening 90 of left support 60 with opening 90 directly to the left of left space 79 and directly to the left of left wall 38.

Left dispenser assembly 4 may be entirely to the left of left wall 40 such that no portion of left assembly 4 is directly behind back wall 36. Over ½ or ¼ length L1 of left dispenser assembly 4 or all of assembly 4 may be directly to the left of left wall 40 and forward of back wall 36 and the front of bumper 51. The front end 70, front segment 82, intermediate segment 84 including upper and lower arms 86 and 88, faucets 62, opening 90, surfaces 91 and 93, grate 92, pan 94 and a portion of rear segment 80 of left assembly 4 may be directly to the left of left wall 38 and forward of back wall 36.

Left bracket 105 may be in its entirety adjacent left rear corner 39, the left side of back wall 36 and the rear section of left wall 38 rearward of rear wheels 18. A portion of left bracket 105 may be directly behind back wall 36 and a portion of left bracket 105 may be directly to the left of left wall 38. Bar 107 and front spacer 109 of left bracket 105 may be entirely to the left of left wall 38. Left bracket 105 front spacer 109 may be adjacent front end 117 and extend inwardly from bar 107 to left wall 38/sidewall 32. Left bracket 105 rear spacer 111/axial bar 115 may have an inner or right end 123 and an outer or left end 125 wherein outer/left end 125 may be spaced outwardly to the left of bumper 51 and plate 113 so that left end 125 is not directly above bumper 51 and plate 113. Inner end 123 may be to the right of left wall 38 and left end 125 may be to the left of left wall 38. Bar 107 adjacent rear end 119 may be rigidly or fixedly secured to rear spacer 111/bar 115 adjacent left end 125 and extend forward therefrom. Spacer 109 may be in contact with left wall 38/sidewall 32. Fasteners 127 (such as those shown in FIG. 2) may extend axially from left bracket 105 front spacer 109 to left wall 38 to rigidly or fixedly secure left spacer 109 to left wall 38/sidewall 32, thereby also rigidly or fixedly securing left bracket 105 to left wall 38/sidewall 32.

The operation of kiosk 1 and the relationship of various components is now described with primary reference to FIGS. 2 and 5 although much of the movement and operational aspects will be understood from the previous description. When the kiosk is in the form of a mobile kiosk or vehicle 1, the driver of the vehicle will drive to a desired selling location for setting up to sell and dispense frozen confections and likely other food items as well. Once the vehicle is parked, dispenser assembly 4 may be immediately ready, without further action by the driver or another person, for operation/dispensing of liquid toppings from faucets 62 by a customer outside kiosk/vehicle 1. Alternately, a movable or entirely removable cover may be used which covers all or a portion of assembly 4 during transit, that is, while vehicle 1 is being driven from a given location to the selling location. In a covered or closed position, such a cover may cover or block access to all of assembly 4 or, for instance, to faucets 62 or to faucets 62 and grate 92 and pan 94. Where such a cover is used, the driver or another person may uncover dispenser assembly 4 (move or remove the cover from assembly 4 or portions thereof, i.e., from the covered or closed position to an uncovered or open position) before assembly 4 is ready for use by customers.

Referring to FIG. 5, once the vendor has parked the vehicle, the system is ready for producing, dispensing and selling frozen confections. More particularly, the vendor or operator may operate device 2 (FIG. 1) to produce frozen confection 3 within a cup, cone, dish or the like after having been ordered by a customer via serving window 44 when panel 46 is open. The vendor then receives money or another form of payment through the service window and hands or moves confection 3 with its container 5 through the service window (Arrow C) to the customer outside the vehicle. Arrows E and F show the general pedestrian or customer traffic flow during the process of selling the frozen confections and applying the liquid topping onto the confection. More particularly, Arrow E illustrates a line of customers and a customer approaching the service window to place the order and Arrow F illustrates the customer walking rearwardly toward dispenser assembly 4, where the customer uses one or more of faucets 62 to apply one or more liquid toppings to the confection. FIG. 5 more particularly illustrates a customer using one of faucets 62 by manually moving control 66 of the given faucet 62 with a finger to open faucet 62 such that the liquid topping flows from one of containers 56 through hose 58 and the corresponding spout 64 and downwardly onto confection 3.

The use of the left and right dispenser assemblies not only increases the overall capacity for dispensing the liquid toppings due to the increased number of faucets 62, but also may increase the rate at which frozen confections 3 may be dispensed from within the kiosk especially in combination with an additional serving window 44 and corresponding panel 46. Thus, one or more workers inside the vehicle may simultaneously form and dispense frozen confections 3 for dispensing through the two service windows 44, thus creating two lines of customers represented by Arrows E, to increase the rate at which frozen confections 3 may be sold and dispensed through service windows 44 and also the rate at which customers may apply the toppings via the various faucets 62 of the left and right dispenser assemblies 4. As noted earlier, the kiosk may be stationary or mobile and may utilize one or more dispenser assemblies external to the kiosk to essentially increase the rate at which frozen confections may be sold and distributed. One or more of the dispensers may be mounted on or adjacent the kiosk, to include the option of a dispenser mounted on a trailer.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration is an example and not limited to the exact details shown or described.

The invention claimed is:

1. A mobile confectionary apparatus, comprising:
a vehicle including an upstanding side wall;
an interior space surrounded by the upstanding side wall and configured to receive at least one person; and
a liquid toppings dispensing system including a housing being positioned adjacent to the upstanding side wall and including a plurality of liquid dispensers configured to dispense at least one liquid topping onto the item,
each of the plurality of liquid dispensers being in fluid communication with at least one reservoir holding the at least one liquid topping, with the liquid toppings dispensing system being located externally of the upstanding side wall and spaced laterally therefrom as to be juxtaposed with the upstanding side wall,
a mounting bracket to mount the housing of the liquid toppings dispensing system to the upstanding side wall, wherein the mounting bracket includes a support bar having an upwardly facing top surface to engage a bottom surface of the housing, and
a spacer including a plate and axial bar which extends behind a back wall of the vehicle wherein the support bar is rigidly or fixedly secured to the spacer.

2. The mobile confectionary apparatus of claim 1, wherein the vehicle includes an opening extending through the upstanding side wall and through which an item may be passed from the interior space to outside of the vehicle.

3. The mobile confectionary apparatus of claim 1, wherein the plurality of liquid dispensers is arranged along an axis that is generally parallel to a longitudinal axis of the liquid toppings dispensing system.

4. The mobile confectionary apparatus of claim 1, further comprising at least one tube extending from the at least one reservoir and being coupled to at least one of the plurality of liquid dispensers.

5. The mobile confectionary apparatus of claim 1, wherein the vehicle is a truck.

6. The mobile confectionary apparatus of claim 1, wherein the vehicle is a trailer.

7. The mobile confectionary apparatus of claim 1, further comprising a catch basin supported by the housing and located beneath the plurality of liquid dispensers.

8. The mobile confectionary apparatus of claim 1, further comprising at least one port in the at least one upstanding side wall through which the at least one tube extends to couple the at least one reservoir to the at least one of the plurality of liquid dispensers.

9. A mobile confectionary apparatus, comprising:
a vehicle including an upstanding side wall;
an interior space surrounded by the upstanding side wall and configured to receive at least one person; and
a liquid toppings dispensing system including a housing being positioned adjacent to the upstanding side wall and including a plurality of liquid dispensers configured to dispense at least one liquid topping onto the item,
each of the plurality of liquid dispensers being in fluid communication with at least one reservoir holding the at least one liquid topping, with the liquid toppings dispensing system being located externally of the upstanding side wall and spaced laterally therefrom so as to be positioned parallel with and overlay the upstanding side wall, a mounting bracket to mount the housing of the liquid toppings dispensing system to the upstanding side wall, wherein the mounting bracket includes a support bar having an upwardly facing top surface to engage a bottom surface of the housing, and a spacer including a plate and axial bar which extends behind a back wall of the vehicle wherein the support bar is rigidly or fixedly secured to the spacer.

10. The mobile confectionary apparatus of claim 9, wherein the vehicle includes an opening extending through the upstanding side wall and through which an item may be passed from the interior space to outside of the vehicle.

11. The mobile confectionary apparatus of claim 9, wherein the plurality of liquid dispensers is arranged along an axis that is generally parallel to a longitudinal axis of the liquid toppings dispensing system.

12. The mobile confectionary apparatus of claim 9, further comprising at least one tube extending from the at least one reservoir and being coupled to at least one of the plurality of liquid dispensers.

13. The mobile confectionary apparatus of claim 9, wherein the vehicle is a truck.

14. The mobile confectionary apparatus of claim 9, wherein the vehicle is a trailer.

15. The mobile confectionary apparatus of claim 9, further comprising a catch basin supported by the housing and located beneath the plurality of liquid dispensers.

16. The mobile confectionary apparatus of claim 9, further comprising at least one port in the at least one upstanding side wall through which the at least one tube extends to couple the at least one reservoir to the at least one of the plurality of liquid dispensers.

17. A mobile confectionary apparatus, comprising:

a vehicle including an upstanding side wall;

an interior space surrounded by the upstanding side wall; and a liquid toppings dispensing system including a housing being positioned adjacent to the upstanding side wall and including a plurality of liquid dispensers configured to dispense at least one liquid topping onto an item, each of the plurality of liquid dispensers being in fluid communication with at least one reservoir holding the at least one liquid topping, with the liquid toppings dispensing system being located externally of the upstanding side wall and spaced laterally therefrom so as to be positioned parallel with the upstanding side wall, a rigid dispenser support to carry the plurality of liquid dispensers, wherein the rigid dispenser support includes a first side and a second side defining a thickness therebetween such the plurality of liquid dispensers does not extend outside of the thickness, and a mounting bracket to mount the housing of the liquid toppings dispensing system to the upstanding side wall, wherein the mounting bracket includes a support bar having an upwardly facing top surface to engage a bottom surface of the housing, and a spacer including a plate and axial bar which extends behind a back wall of the vehicle wherein the support bar is rigidly or fixedly secured to the space.

\* \* \* \* \*